US011914042B1

(12) United States Patent
Schaefer

(10) Patent No.: US 11,914,042 B1
(45) **Date of Patent: *Feb. 27, 2024**

(54) SYSTEM AND METHOD FOR MEASURING THE POSITION OF A MOVING OBJECT

(71) Applicant: Philip Raymond Schaefer, Weaverville, NC (US)

(72) Inventor: Philip Raymond Schaefer, Weaverville, NC (US)

(73) Assignee: Vortant Technologies, LLC, Weaverville, NC (US)

( * ) Notice: Subject to any disclaimer, the term of this patent is extended or adjusted under 35 U.S.C. 154(b) by 198 days.

This patent is subject to a terminal disclaimer.

(21) Appl. No.: 17/506,608

(22) Filed: Oct. 20, 2021

Related U.S. Application Data

(63) Continuation of application No. 16/214,587, filed on Dec. 10, 2018, now Pat. No. 11,169,268.

(60) Provisional application No. 62/597,840, filed on Dec. 12, 2017.

(51) Int. Cl.

| | |
|---|---|
| ***G01S 17/58*** | (2006.01) |
| ***G01P 3/68*** | (2006.01) |

(52) U.S. Cl.
CPC ................ *G01S 17/58* (2013.01); *G01P 3/68* (2013.01)

(58) Field of Classification Search
None
See application file for complete search history.

(56) References Cited

U.S. PATENT DOCUMENTS

| | | | | |
|---|---|---|---|---|
| 5,884,239 | A * | 3/1999 | Romanik, Jr. | G01S 17/875 345/158 |
| 7,383,152 | B1 * | 6/2008 | Moore | G01B 11/002 702/159 |
| 9,519,003 | B1 * | 12/2016 | Okur | G02B 6/4292 |
| 2015/0267433 | A1 * | 9/2015 | Leonessa | G01C 15/002 701/28 |
| 2018/0353828 | A1 * | 12/2018 | Otten | A63B 24/0003 |

* cited by examiner

*Primary Examiner* — Luke D Ratcliffe

(57) ABSTRACT

A system shines a series of light stripes across an area. A target object passes through the area and light is reflected to the system from the light stripes as it passes through. Based on the timing of the received light from each of the light stripes, the system calculates the position and velocity of the target object.

22 Claims, 10 Drawing Sheets

SYSTEM AND METHOD FOR MEASURING THE POSITION OF A MOVING OBJECT

CROSS-REFERENCE TO RELATED APPLICATIONS

This application is a continuation and claims the benefit of co-pending U.S. patent application Ser. No. 16/214,587, filed Dec. 10, 2018, which claims the benefit of U.S. Provisional Application No. 62/597,840, filed Dec. 12, 2017.

GOVERNMENT LICENSE RIGHTS

Some aspects underlying this invention were made in part with United States government support under one or more SBIR grants from the National Institutes of Health. The United States government may have certain rights in this invention.

FIELD OF INVENTION

This invention relates generally to sensing the position of an object relative to a sensor and more particularly, to a device that uses stripes of light for measuring the position of an object that moves relative to the stripes of light.

BACKGROUND OF THE INVENTION

Review of Existing Solutions to Similar Problems

This section includes a review of currently-available technology and some approaches in R&D. We conclude that there is a significant unmet need for the functionality available with the present invention.

There are various applications in which it is desirable to use light to measure distances. Examples of such applications include measuring a distance between a camera and a subject for auto focusing, measuring distances during surveying, measuring astronomical distances, etc. Correspondingly, a variety of methods that use light for measuring distances have been described. One method for measuring distances with light is to measure the time for a light pulse to travel between two points. For example, U.S. Pat. No. 5,532,813 to Ohishi et al, discloses a method for measuring distances using lasers wherein a distance measuring means calculates relatively long distances, e.g. kilometers in distance, to a target based on the time difference between a light beam emission and the reception of a return light beam from the target. However, the lasers and optics in such approaches are too complex and expensive for budget limited or highly miniaturized applications. Other, lower cost methods for the time of flight measurement of distances have been described. For example, U.S. Pat. No. 5,701,006 to Schaefer, discloses a method for measuring distances in which Light Emitting Diodes (LEDs) and photodetectors are used in fiber optics, and modulation frequencies in the MHz range are used to measure time delays. Although such approaches use lower-cost LEDs and photodetectors, relatively short, properly shaped pulses are required. Electronics in the radio frequency range must also be used to process the signals. These factors introduce higher levels of noise into the overall system, thus relatively complex electronics circuitry or specialized, high power pulse generation at the LED is needed. Also, very quickly-moving objects further increase the complexity and performance requirements for the measurement to be made in a very short time, severely limiting the amount of averaging that can be done to reduce noise, since the distance value will be varying rapidly.

For applications such as camera focusing, it is common to transmit a light spot with an LED, then receive an image of the spot at the receiver. By measuring the location of the spot on the received image, the distance to the subject can be determined by triangulation. The basic approach is subject to problems with range and reliability, and various improvements have been described in the following patents. For example, U.S. Pat. No. 5,541,723 to Tanaka, discloses a method of measuring distances that involves the transmission at different angles of two differing light distributions. In this method, the information on the amount of signals received tells how much signal does not impinge on the object of interest. Nakanishi, et al., in U.S. Pat. No. 5,963,309, shows multiple LEDs and photodetectors that are used to increase the range and resolution. Kindaichi, in U.S. Pat. No. 6,172,375, discloses two spaced lens that form images. From these images, positions are measured and calculated for the purpose of increasing the reliability of measurements. However, these approaches still require the use of lenses and obtain images of light spots or patterns.

Approaches in which images or image-like processing are required increase the bulk as well as the cost of a distance measuring system. For example, an approach using stripes of light, reminiscent of the present invention is described in U.S. Pat. No. 7,440,119 to Iwasaki, in which the positions of the stripes of light on an image can be used to infer the shape of the target. Another triangulation technique is disclosed in U.S. Pat. No. 9,494,418 to Schmidt, in which triangulation is used to measure distances in a dental camera. U.S. Pat. No. 9,696,146 to Blanckaert et al. discloses a concept of shining planes of light on an object and using an imaging sensor to infer the shape of the object based on the pattern of received light. U.S. Pat. No. 9,482,529 to Becker et al. shows the use of a projector and imager to scan for three-dimensional information about a target. However, the shape calculations using one- or two-dimensional imaging require many data points on an acquired image, thus slow down the process compared to an approach using just a few LEDs and photodetectors.

Some fast and efficient techniques use triangulation or other ratiometric techniques to determine the distance to a target. Triangulation techniques exist for measuring the position of an object using light from a series of light sources, such as U.S. Pat. No. 7,221,437 to Schaefer, which uses light sources at different distances from a target, and U.S. Pat. No. 7,123,351 to Schaefer, which uses light sources with offset positions and angles. In this prior art, the difference in distance and angle of the target object from the light source causes predictable differences in the amplitude of the reflected light received from multiple light sources, which can, in turn, be used to calculate the position of the object. However, there are some issues that may occur with objects that have irregular shapes, or have irregular light reflectivity, such as objects that have specular as well as diffuse reflection, which can cause unpredictable changes in the reflected amplitudes, and thus cause errors in measurement systems based on the relative amplitudes of reflected light.

OBJECTS AND ADVANTAGES OF THE PRESENT INVENTION

Therefore, several objects and advantages of the present advantage are:

(a) Measure the position of a target object in two or three dimensions, (b) Perform the measurement with low-cost optical devices, such as LEDs and photodiodes or phototransistors, (c) Perform the measurement very quickly and efficiently, within minimal processing or data acquisition steps, (d) Perform the measurement without the need for 1-D or 2-D imaging arrays, (e) Provide a measurement system that uses the timing of the object as it passes through the light patterns emitted by series of light sources, rather than the amplitude of the light reflected from the series of light sources, to measure distance.

SUMMARY OF THE INVENTION

One embodiment of the present invention shines a set of multiple stripes of light, some twisted and/or tilted in orientation with respect to each other, through which the target object moves, and the timing of the received light pulses from each of the stripes of light as the target passes through them is used to infer the 3-D position of the target.

An alternate embodiment of the present invention utilizes multiple stripes of light that are moving by means of mechanical or electrical beam-aiming mechanism and the positions of one or more targets are determined by the timing at which each of the stripes of light is reflected from the targets, One embodiment of the present invention serves as a security sensor, and utilizes invisible infrared light stripes for detection of moving objects, such as walking pedestrians or flying drones. Yet another embodiment of the present invention uses invisible infrared light stripes for measuring flight parameters of consumer products, such as footballs being kicked or thrown.

DESCRIPTION OF THE PREFERRED EMBODIMENTS

Figure 1:
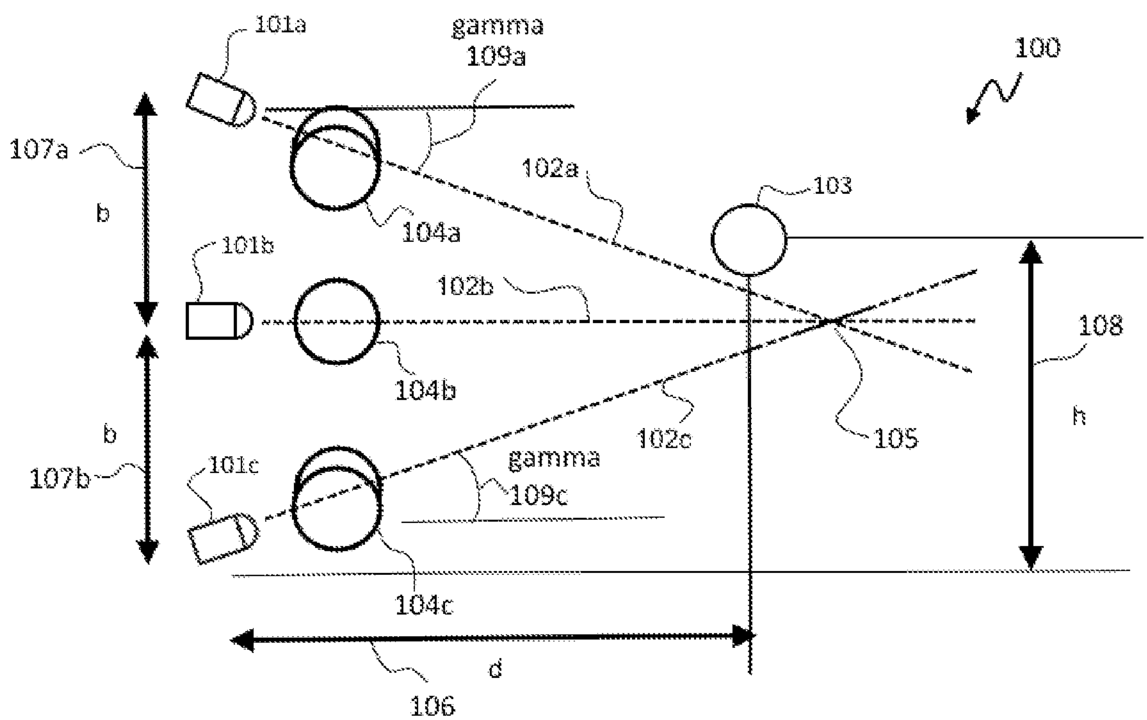
FIG. 1 depicts a preferred embodiment of a moving-target measurement system using three light stripes.

FIG. 1 shows a side view of an embodiment 100 of the present invention in which a row with LEDs 101*a*, 101*b*, and 101*c* that are perpendicular to the direction of travel of, and facing a target 103, which is traversing a trajectory perpendicular to the plane of the drawing, depicted for convenience in this drawing at a horizontal or x-direction distance d 106 from the LEDs, and at a height 108 of h over the baseline height, which in this drawing is at the height of the lowest LED 101*c*. Although a perpendicular direction of travel is depicted here, other directions of travel fall within the scope of the present invention and can be accommodated by identical or slightly revised equations as in these example embodiments. Height 108, of length h, also referred to herein as h or h 108, could alternately be termed the vertical position, y coordinate, etc., of the target object. For orientations of the system other than the one shown in FIG. 1, h may not correspond to height, but rather to the distance from some other meaningful reference plane that is not in the plane of the LEDs 101*a*, 101*b*, and 101*c* and that is defined relative to the sensing location, or equivalently, relative to the positions of LEDs 101*a*, 101*b*, and 101*c*. The LEDs 101*a*, 101*b*, and 101*c* are preferably in the infrared range, but could be in any visible or invisible part of the spectrum, separated by distances 107*a* and 107*b* of length of b, although they could alternately be spaced at different distances. It will be clear to those of skill in the art that d and h could be defined in almost any other directions that define a 2-D position in space relative to the sensing location and the LEDs, though a distance and height are convenient for many applications of the present invention. The LEDs 101*a*, 101*b*, and 101*c* are oriented such that their tilt angle from the horizontal are not all the same—in this case, LED 101*a* is tilted downward by tilt angle 109*a* of gamma, LED 101*b* is level, and LED 101*c* is tilted upward by a tilt angle 109*c* of gamma. Although LEDs 101*a*, 101*b*, and 101*c* are preferably co-linear in their mounting, as is implied in FIG. 1, other arrangements of the LEDs are used in alternate embodiments of the invention, but require modifications to the equations for determining object position, as will be apparent to those of skill in the art.

An alternate embodiment of the present invention uses an optical component, rather than the aiming of the LEDs themselves, to achieve the tilt angles 109*a* and 109*b* shown with values of gamma in FIG. 1. For example, the LEDs may all be mounted in their desired configuration, for example, parallel to each other, on a circuit board or other mounting, and then prisms, lenses, light-shaping sheets, reflective surfaces, or other optical means are used to effect the tilt and twist (described below) angles to achieve the concepts described herein for the present invention.

Preferably, there is an optical mechanism to create stripes of light from the LEDs 101*a*, 101*b*, and 101*c*, such as a light slit, or in the preferred embodiment, a cylindrical lens, such as lenses 104*a*, 104*b*, and 104*c*. Alternately, flat lenses, such as a Fresnel-style lens, could be used to obtain a similar effect. Alternately, light-shaping materials, such as commercially-available light-shaping diffuser sheets are used. Alternately, a row of light sources, such as multiple LEDs create a stripe by virtue of being aimed in a fan-type or row shape.

The patterns of light are referred to herein as "light stripes", because they will appear as stripes of light on a reflective plane, such as a piece of paper, inserted vertically and perpendicular to the figure, although in 3-D space, they might alternately be described in terms of a triangle or quadrilateral with a point or short side at the light source and extending rightward in the drawing. The light stripes are referred to as "parallel" to each other if they appear substantially parallel as projected onto a relatively distant plane, even though their planar extents in space may diverge with distance from the light source. Another definition of "parallel" light stripes, as the term is used herein, is if the light stripes have nearly-equal twist angles, which will be defined below.

In the preferred embodiment of the invention, the center cylindrical lens 104*b* is oriented approximately parallel to the expected direction of flight of target 103, and lenses 104*a* and 104*c* are rotated in a manner referred to herein as "twisted" or located at a "twist angle" alpha with respect to that direction, such that the light stripes are also twisted, in other words, are not in a vertical orientation, when viewed as projected onto a vertical plane perpendicular to the embodiment of the invention 100 as shown in FIG. 1.

Figure 2:
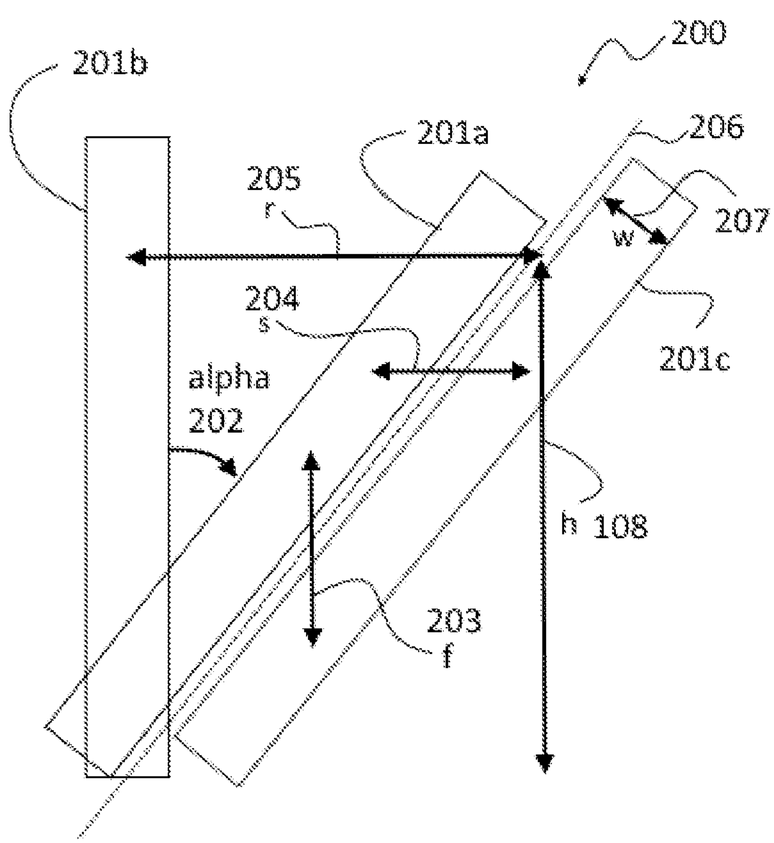
FIG. 2 illustrates an example of an embodiment of the pattern that a three-light-stripe measurement would make on a planar surface located in front of the system.

FIG. 2 depicts a light stripe pattern 200, which includes a series of light stripes 201*a*, 201*b*, and 201*c* as an example of the stripes that would illuminate a plane at distance d from the LEDs 101*a*, 101*b*, and 101*c* with lenses 104*a*, 104*b*, and 104*c* as described above. Since the cylindrical lens 104*b* has its axis horizontal, stripe 201*b* is shown as vertical. Since the cylindrical lenses 104*a* and 104*c* are twisted (in other words, rotated with respect to the axis of the respective LED) by an angle alpha, stripes 201*a* and 201*c* are likewise twisted by an angle 202 of alpha. The orientation of the target object path, vertical and horizontal in the drawing, etc. are shown in FIG. 1 in one convenient orientation for purposes of explanation. Of course, the entire assembly could be rotated to any other configuration, for example, vertical cylindrical lens and horizontal stripes, etc.

Figure 3:
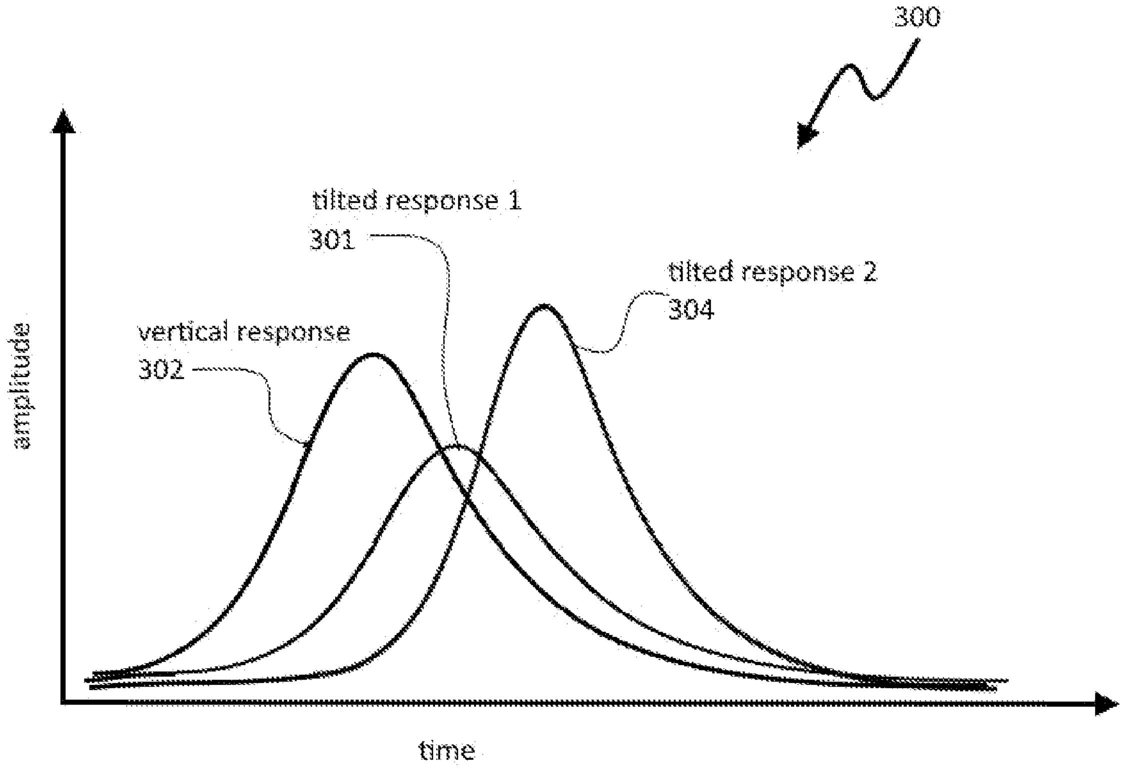
FIG. 3 illustrates an example of the detected light signals that would result from a target object passing in front of the system.

The rationale for this arrangement of the LEDs, lenses, and light stripes is as follows: When the target moves across the light stripes depicted in FIG. 2, it passes through the three light stripes, but the timing will depend both on the height, for example, h 108 and the distance, for example, d 106. FIG. 3 shows an example response signal plot 300 of the light reflected from a target passing through the light stripes 201*a*, as tilted response-1 301, light stripe 201*b*, as vertical response 302, and light stripe 201*c*, as tilted response-2 303. As will be described below, the timing of the responses is what is important in the present invention, rather than the amplitudes of the responses, so it is not required that the light stripes have uniform illumination over their extents, even though that is preferable if possible.

In the preferred embodiment, the LEDs 101*a*, 101*b*, and 101*c* are sequentially illuminated, and one or more photodetectors aimed at the scene will detect the reflected light, such that the light response signals from the various light stripes can be individually measured. The photodetectors are preferably mounted near or adjacent to the LEDs 101*a*, 101*b*, and 101*c*. In the preferred embodiment, the LEDs are illuminated with modulated light to avoid issues of ambient light interference.

In an alternate embodiment, the LEDs 101*a*, 101*b*, and 101*c* are illuminated simultaneously with different modulation frequencies, and the circuitry of the one or more photodetectors filters out the responses at different frequencies. Alternately, pairs of LEDs 101*a*, 101*b*, and 101*c*, and/or all of the LEDs 101*a*, 101*b*, 101*c* could be simultaneously illuminated, and the individual LED contributions extracted by mathematical means, for example, by solving linear equations involving the summations of the LED signals received in the light response signals.

In yet another embodiment of the present invention, the LEDs 101*a*, 101*b*, and 101*c* emit light at different optical frequencies, and detectors at the different optical frequencies would detect the light from fewer than all of the LED sources.

The simplest embodiment of the photodetectors may be a single photodetector, such as a photodiode or phototransistor, that can detect light from the entire area illuminated by the light stripes. Preferably, the field of view, sensitivity cone, or sensitivity volume from which the photodetectors receive light signals corresponds to the region of space illuminated by the light stripes and through which the target object is expected to pass. Optionally, a cylindrical lens, slit, light-shaping material, or other optical means known in the art could also be used with the photodetector, to match its spatial region of sensitivity to the area illuminated by the light stripes. Alternately, multiple photodetectors are optionally aligned so as to detect light primarily from certain of the light stripes.

Due to the spacings 107*a* 107*b* of length b and the tilt angles 109*a* and 109*c*, if distance d 106 is near zero, the vertical spacing f 203 between light stripes 201*a* and 201*c* will be approximately 2b. However, as d becomes greater, the spacing f 203 will become smaller and smaller with increasing distance d 106, until it reaches zero at point 105, and then it will reverse its sign with further increasing distance. The horizontal spacing 204 of length s will similarly vary, so the time difference between when the target 103 passes through light stripes 201*a* and 201*c* will be a function of the speed of the target 103, as well as the distance d 106.

It should be noted that for embodiments of the present invention where the tilt angles 109*a* and 109*c* are not equal and opposite, there will not be a single point 105 where all three light stripes converge, but the essence of the pattern of the light stripe parameters remains valid and similar calculations are made.

In a similar fashion, the distance 205 of length r from the vertical light stripe 201*b* to the light stripes 201*a* and 201*c*, and also the centerline 206 between light stripes 201*a* and 201*c*, will vary both as a function of the height 108 of h of the target 103 and the speed of the target 103 as it passes through the light stripes.

A third, related relation is the time it takes for the target 103 to pass through each of the three light stripes. If the target is very small compared to the stripe width 207 of w, the time it is illuminated will be a function primarily of the target speed v and the stripe width 207 of w, by r t=d, or $$\text{time in vertical stripe } 201b = w/v, \text{ and} \quad (1)$$

$$\text{time in twisted stripe } 201a \text{ or } 201c = w/(v \cos(\text{alpha})) \quad (2)$$

or by any alternate relation that will be apparent to those of skill in the art. If the target 103 cannot be considered a point, but its width W as it passes through the light stripe is known, the approximate relation in one embodiment of the invention is $$\text{time in vertical stripe } 201b = (w+W)/v, \text{ and} \quad (3)$$

$$\text{time in twisted stripe } 201a \text{ or } 201c = (w+W)/(v \cos(\text{alpha})) \quad (4)$$

Alternately, if the shape of the target 103 is not known, but it has a repeatable optical signature as it passes through the beam, the time for a part of the response waveform of the light reflected from the light stripe from the target 103 can be found. Or alternately, a relative speed of the target 103 is measured instead, as will be apparent to those with skill in the art.

Figure 4:
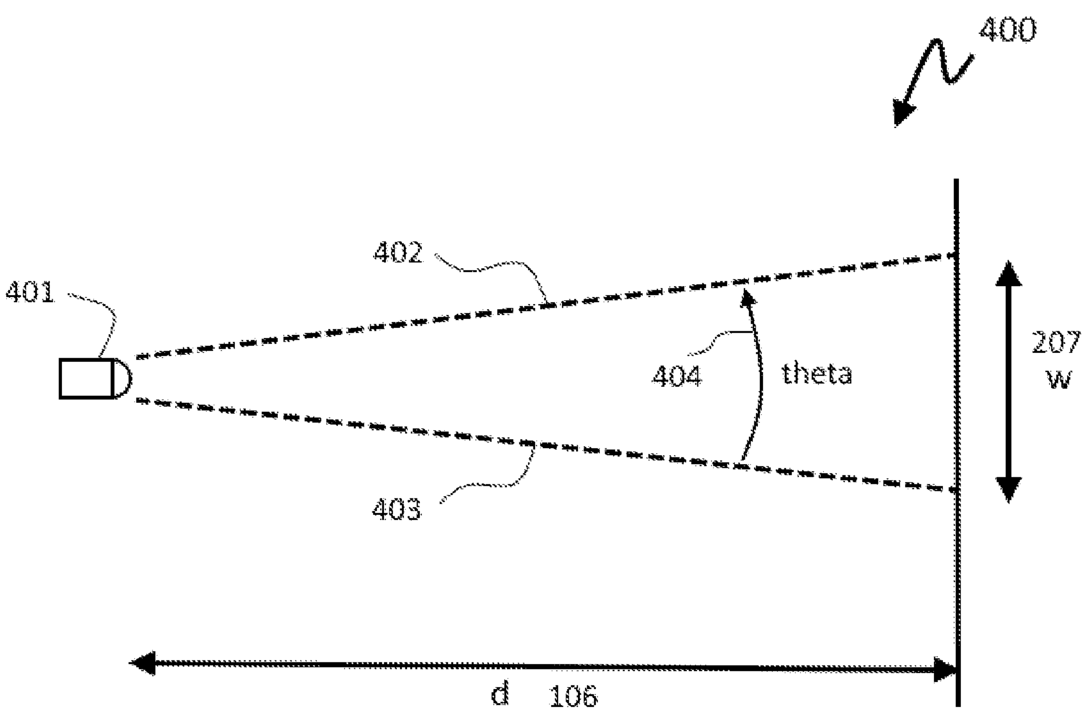
FIG. 4 illustrates the geometry of an exemplary light stripe according to the present invention.

FIG. 4 depicts a light beam configuration 400, that produces a width 207 of w, for an LED or other light-emitting device 401, with beam edges 402 and 403, and a spreading angle 404 of value theta, at a distance d 106 from an LED 401, which here, for example, could represent any of LEDs 101*a* 101*b*, or 101*c*. The expression for the value of w of width 207, for example, is approximately $$w = d \tan(\text{theta}) \tag{5}$$

Regardless of the details of how the timing above is determined, the basic idea of this embodiment of the present invention is that the above three timing relationships can together be solved to obtain at least three output variables from the system: the position (variables h 108, and d 106) with respect to the LEDs 101*a*, 101*b*, 101*c* array, and the speed v of the target.

In the following paragraphs, some example equations that exemplify a preferred embodiment of how to solve for these variables are shown. They are merely examples that illustrate possible embodiments of the present invention.

For example, the problem can be cast in terms of three timing measurements that can be expressed as three time-difference measurements as follows:

The first timing measurement is tr, the time difference for the target to traverse the length r 205 of FIG. 2, between when the target 103 is centered in the vertical stripe 201*b* to the midpoint 206 between the target 103 centered in twisted stripes 201*a* and 201*c*. The midpoint 206 in a preferred embodiment is defined and computed in terms of the times at which the peaks, in other words, peak amplitudes 301, 302, and 304 are measured, as shown in FIG. 3. tr could be found, for example, by computing the time difference between the peak of vertical response 302 and the average time of the peaks 303 and 304.

In an alternate embodiment of the present invention, tr corresponds to the time difference for the target to traverse the length between the target 103 centered in the vertical stripe 201*b* to either twisted stripe 201*a* or twisted stripe 201*c*. The equations can be equivalent to those below if the coordinate system is defined so that the twisted stripe intersects the vertical stripe at the zero value in the vertical direction.

The second timing measurement in this embodiment is ts, the time difference for the target to traverse between the two twisted stripes, or to traverse the distance s 204 of FIG. 2. This is found, for example, by computing the time difference between the peaks of 303 and 304.

The third timing measurement in this embodiment is tw, the time for the target to traverse one of the light stripes, for example in one embodiment this is found by computing the temporal width (for example at the half-peak amplitude points) of a peak response in the response signal, such as vertical response 302, or by taking the width of 303 or 304 and dividing by the cosine of the angle alpha, since the target object will take longer to traverse these light stripes that are twisted relative to the perpendicular of the target path. FIG. 4 depicts how the width w 207 is a function of the beam spread theta 404 and distance d 106. From LED 401, the edges of the beam 402 and 403 diverge, as will be apparent to those of skill in the art. If a cylindrical lens is inserted with its axis in the plane of FIG. 4 with its axis perpendicular to the centerline of the LED radiation between 402 and 403, the beam will be spread perpendicular to the plane of FIG. 4, but the width w 207 will be approximately the same as shown in the figure. Slight adjustments for the difference in the path of edges 402 and 403 as a function of the index of refraction of the lens could optionally be made, as will be apparent to those of skill in the art.

A rule of thumb for which stripe to use for the tw measurement could be to use the response pulse that has the highest amplitude, as this would likely provide the most-accurate estimate of the pulse width. Alternately, a weighted average of the pulse widths from the three pulses is used, each weighted proportionally to its amplitude.

Below are some example time relations for how tr, ts, and tw are combined in one embodiment of the present invention to compute the output values:

$$tr = r/v = h\ \tan(\text{alpha})/v \tag{6}$$

$$ts = s/v = f\ \tan(\text{alpha})/v == 2(b - d\ \tan(\text{gamma}))\tan(\text{alpha}))/v \tag{7}$$

$$tw = d\ \tan(\text{theta})/v \tag{8}$$

In the derivation underlying one embodiment of the invention, equation 7 can be manipulated. Let q=1/v to aid in the simplicity of the expressions.

$$ts = 2q \tan(\text{alpha})(b - d \tan(\text{gamma})) \tag{9}$$

Solving equation 8 for q, and substituting for q in equation 9 yields $$ts = 2tw \tan(\text{alpha})(b - d \tan(\text{alpha}))/d \tan(\text{theta}) \tag{10}$$

solving for $d$ yields $$d = b/(\tan(\text{gamma}) + ts \tan(\text{theta})/(2tw \tan(\text{alpha}))) \tag{11}$$

Then, once d is known, equation 8 can be used again to solve for v $$v = d \tan(\text{theta})/tw \tag{12}$$

and finally, equation 6 can be used to solve for h:

$$h = tr\ v/\tan(\text{alpha}) \tag{13}$$

These equations can be utilized to solve for the unknowns d, h, and v by several methods. The most obvious is to use the above algebraic equations to solve literally. If the stripes are not arranged exactly as depicted in FIG. 2, such as being offset, it will be clear to those of skill in the art that the equations can be modified to account for such offsets and variations. For example, constant offsets added to d and h may be introduced into the equations to account for such shifts such as adding a constant d.offset to equation 11:

$$d = d.\text{offset} + b/(\tan(\text{gamma}) + ts \tan(\text{theta})/(2tw \tan(\text{alpha})) \tag{14}$$

or adding a constant h.offset to equation 13:

$$h = h.\text{offset} + tr\ v/\tan(\text{alpha}) \tag{15}$$

Constant offsets for the values of tr, tw, and ts may also be added to the equations, as will be apparent to compensate for offsets and other geometric variations, which are within the scope of the present invention and are embodiments of the present invention.

Approximations for one or more of the other parameters in the equations above, such as theta, gamma, and alpha, may be needed to compensate for imperfections from the ideal stripe projections of FIG. 2, such as imperfect lenses, slight offset angles in the projection onto the plane of the path of the target, etc.

If stripes 201*a* and 201*c* are not exactly parallel, the distance at the center of the stripe lengths can be used as an approximation when solving for ts. In another embodiment of the present invention, equations similar as the above, using basic trigonometric relations similar to those above, could solve for a more exact determination of the distance between the twisted light stripes, and preferably, also redefine r as the distance between stripes 201*a* and 201*b*, to not require the concept of the centerline 206 in the derivation of the equations.

Another solution technique is to use the equations to generate lookup table solutions, neural networks, or other mappings known in the art that may be preferable if there are imperfections in exact stripe widths, angles, etc., that may cause errors if the exact expressions above were to be used. In one embodiment of the present invention, the solution would proceed analogously to the algebraic technique by:

Create a lookup table of d vs. ts/tw, which could be measured by a series of experiments with known d, h, and/or v values.

Optionally, create a second lookup table of v vs. tw/d.

Create a lookup table of h vs. tr v.

(In some embodiments of the present invention, it appears that the relationship of h vs. tr/v is more or equally as useful as h vs. tr v., this may also be included in the algebraic solution in yet another alternate embodiment of the present invention.) Then, when data from the sensors are acquired:

Use the measured ts and tw values to calculate ts/tw, which is used as an index into the first lookup table, which will in turn provide a value for d.

Use the looked-up d value and measured tw value to look up a value for v, or alternately, since equation 12 has the least opportunity for error, calculate v from d and tw using equation 12. Omitting this lookup table allows for collecting data without knowing the v value, inferring it from the algebraic solution. For example, a pendulum or other test fixture can be configured to pass a target past the system at a known d and h value, and lookup tables made for the above, without knowledge of the v value.

Use the computed value for v, the measured value for tr, and the lookup table of h vs. tr v to look up a value for h.

It will be clear to those of skill in the art that a combination of the above lookup-table and algebraic techniques could be used, or similar, but not identical equations could be used for the algebraic techniques.

Another embodiment of the present invention uses curve fitting to create equations for calculating the above parameters. For example, linear regression to create a linear or other functional shape to approximate the curves could be obtained from experimental data, similar as the lookup table case above. One example embodiment is:

Fit a curve or line to the relationship of d vs. ts/tw, which could be measured by a series of experiments with known d, h, and/or v values.

Optionally, fit a second curve or line to v vs. tw/d.

Fit a curve or line to h vs. tr v.

Variations on the Hardware

Instead of the three stripes as shown, any one of the three stripes could be divided into a set of shorter stripes, which could be co-linear or could be otherwise shifted to cover the desired range of target traversals.

The light stripes could be shifted horizontally, and the above relations would still be similar and solvable by taking the modified positions into account.

The light stripes could be twisted in different angles than the ones shown in FIG. 2, for example all twisted, two verticals and one twisted, etc.

Figure 8:
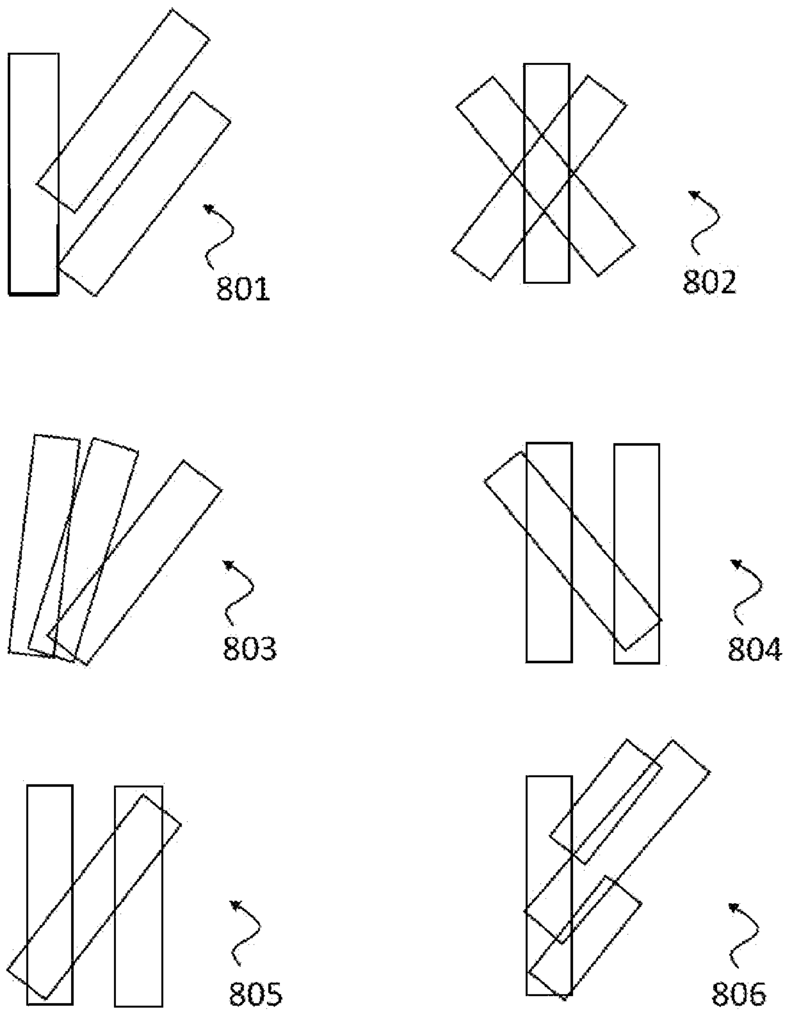
FIG. 8 illustrates several potentially different embodiments of the pattern of light stripes with the present invention.

FIG. 8 graphically depicts several alternate light stripe patterns in the twists of the light stripes for alternate embodiments of the present invention. Light stripe pattern 801 is as described above; two twisted stripes with one vertical stripe. Light stripe pattern 802 has the two twisted stripes at different twist angles. Light stripe pattern 803 has all three stripes twisted at different angles. Light stripe pattern 804 has two vertical stripes and one twisted stripe. Light stripe pattern 805 is similar, but with the twisted stripe twisted in a different direction. Light stripe pattern 806 replaces one or more of the longer light stripes of light stripe pattern 801 with multiple shorter light stripe patterns, each of which detects targets in a different part of the overall light stripe pattern 806. Permutations of these light stripe patterns could be used within the scope of the present invention. In similar fashion, additional, redundant light stripes beyond the basic three described in the above examples could be used to reduce errors and obtain additional data to increase the robustness of the measurement system.

In all cases, many of the various light stripes may be shifted or twisted with respect to each other and retain the same basic functionality, simply taking into account these shifts in the equations used to calculate the outputs of object position and velocity according to the present invention.

Instead of spacing the light sources 101*a*, 101*b*, and 101*c* perpendicular to the direction of travel, they could be spaced in parallel to the direction of travel or in another linear or polygonal arrangement that is not perpendicular or parallel to the direction of travel. Similarly to the above, as the plane under consideration gets farther from the location of the light sources, the relative positions of the light stripes will change, and analogous techniques will yield expressions for the location and speed of the target.

Figure 9:
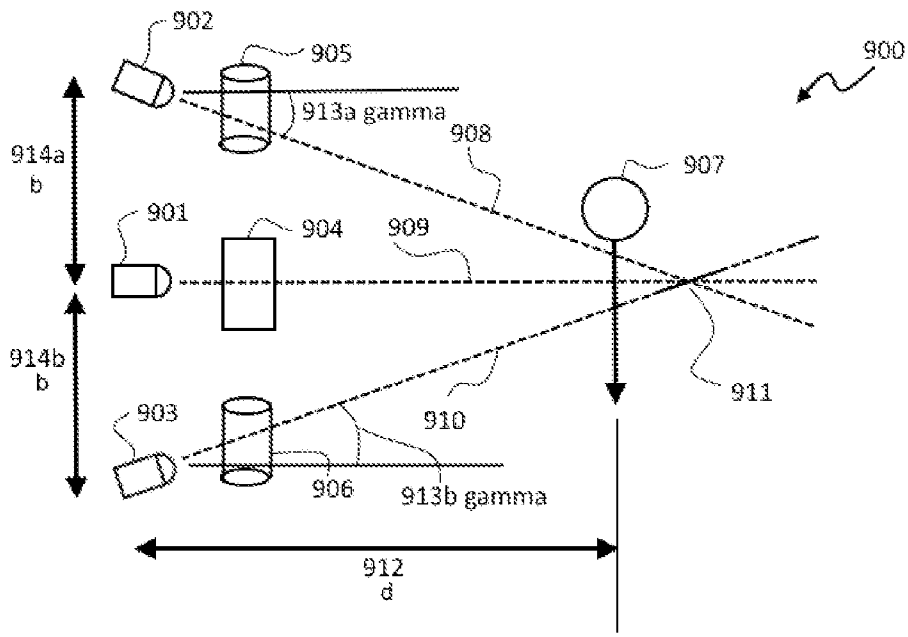
FIG. 9 illustrates an embodiment of the present invention utilizing light-stripe LEDs in a different relative orientation than the embodiment of FIG. 1.

A preferred embodiment of the invention for LEDs spaced approximately parallel to the direction of travel is depicted in FIG. 9, showing a top view of a preferred embodiment of the present invention 900. The figure shows a horizontally-traveling target 907, which here is shown at a distanced 912 from the line of LEDs 901, 902, and 903. LED 901 is aimed straight ahead along path 909, whereas LEDs 902 and 903 are aimed by an angle gamma 913*a* and 913*b* respectively inward along paths 908 and 910, respectively, all converging at point 911. Cylindrical lens 904 is oriented horizontally in front of LED 901 to create a vertical light stripe, whereas cylindrical lenses 905 and 906 are twisted by an angle alpha, creating a twisted light stripe.

Similarly to the light stripes shown above, FIG. 10 depicts an example set of light stripes 1000 corresponding to FIG. 9, although the light stripes are shifted to depict the flexibility of the present invention for so doing. Vertical light stripe 1002 results from LED 901, whereas twisted light stripe 1001 results from LED 902 and a second twisted light stripe 1003 results from LED 903. The twisted light stripes are oriented at an angle alpha due to the twist angle of the cylindrical lenses 905 and 906.

Equations for computing the position and velocity of target 907 proceed analogously as in the above case. Example equations showing the spirit of the invention are shown here. Distance s 1004 is the horizontal distance between stripes 1001 and 1003. Distance r 1005 is the distance between the center of stripe 1002 and centerline

1006 between stripes 1001 and 1003. Alternately, r is defined the distance between stripe 1002 and one or more of the stripes 1001 and 1003 as described for the vertical case, above. Distance h 1007 is the height of the target as it passes through the light stripes 1001, 1002, and 1003. Distance w 1008 is the width of stripe 1008, and preferably, also with width of stripes 1001 and 1002.

From the top view of FIG. 9, it can be determined that $$\tan(\text{gamma})=(b-s/2)/d \quad (16)$$

Figure 10:
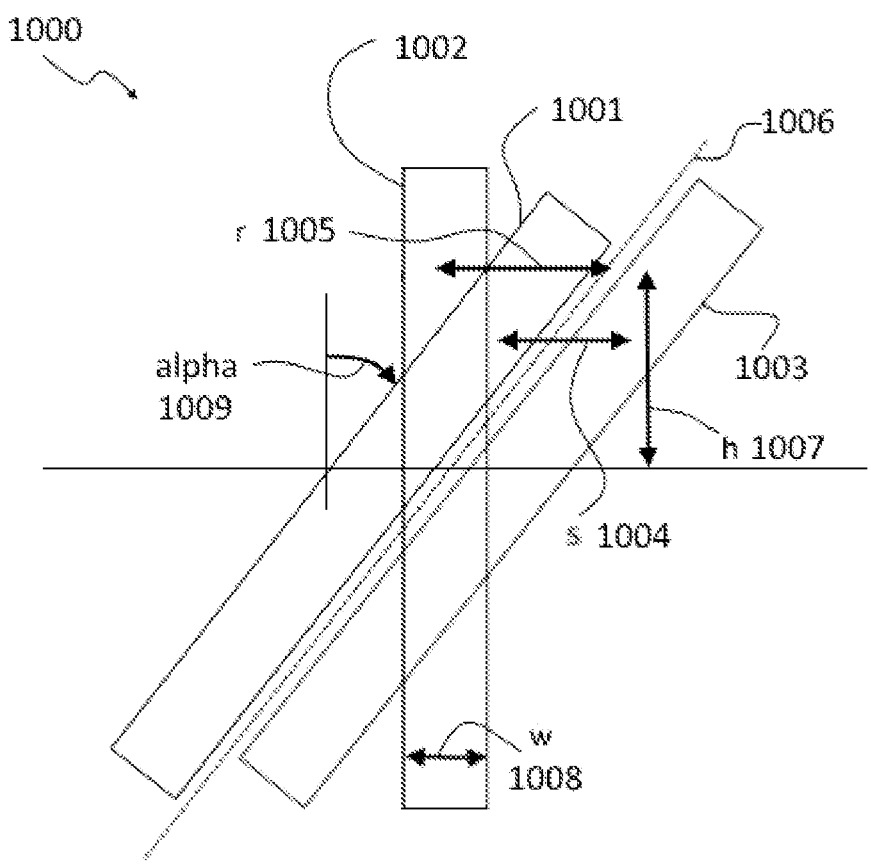
FIG. 10 illustrates an example of an embodiment of the present invention utilizing two parallel light stripes and calculations based on the centerline of the two parallel light stripes.

From FIG. 10, it can be seen, referring to twist angle alpha 1009, that $$\tan(\text{alpha})=r/h \quad (17)$$

And, an approximation for small theta from the same calculations shown in FIG. 4

$$\tan(\text{theta})=w/d \quad (18)$$

Using the well-known speed equation r t=d, these equations can be restated in terms of the measured times as observed by the sensor system:

$$d=(b-v/2ts)/\tan(\text{gamma}) \quad (19)$$

$$h=v\ tr/\tan(\text{alpha}) \quad (20)$$

$$d=v\ tw/\tan(\text{theta}) \quad (21)$$

where ts is the time for the target to traverse distance s, tr is the time for the target to traverse distance r, and tw is the time for the target to traverse stripe 1002 (related to the times to traverse stripes 1001 and 1003 per a cos (alpha) relation, as will be apparent to those of skill in the art).

An algebraic solution can be found by substituting equation 21 into equation 19 to solve for v in terms of ts and tw, then solving for h with equation 20, as will be apparent to those of skill in the art.

And as above, instead of the algebraic solution, lookup tables, neural networks, or other machine learning techniques are used in alternate embodiments of the present invention to solve for these variables. For example, a lookup table, neural network, or other data-fitting mechanism known in the art to calculate d as a function of ts/tw starts the process in one embodiment of the invention, followed by a lookup of v vs. d/tw, and finally a lookup of h vs. v tr.

Instead of spacing the light sources 101*a*, 101*b*, and 101*c* along a line, in an alternate embodiment of the present invention, they are placed in another spatial arrangement, as long as there is some spatial separation between them, to allow the changes in relative distances as described above, for example, those relations that are a function of the spacing b. More complex angular relation equations are likely, however, the application of additional trigonometric equations to solve for the position and velocity of the target object will be apparent to those with skill in the art.

Additional light sources and stripes are optionally added in an embodiment of the invention to provide additional redundancy in the measurements, or to provide additional information such as the direction of travel of the target object, which is measurable in another embodiment of the present invention.

Instead of LEDs, other light sources are be used yet other embodiments of the present invention, for example, lasers, incandescent emitters, fluorescent emitters, or radio-frequency emitters.

Instead of a stationary sensor and a moving target, in an alternate embodiment of the invention, light spots are moved through space to scan for stationary or moving targets. One embodiment is a mechanically-rotating set of the LEDs and lenses that scan the region around a fixed or moving observation point. A linearly-scanned configuration of light sources is implemented in another embodiment. Instead of continuous light stripes, light sources may be quickly scanned over the length of the "stripe" with equivalent results. As an alternative to mechanical motion, a series of LEDs and/or lenses are used in yet another embodiment to electrically scan the area. This results in a more discrete response curve than shown in FIG. 2, but similar concepts for solving for the output values apply. One embodiment of an electrically-scanned sensor uses a series of LEDs that share a cylindrical lens, to avoid the cost of many lenses. Each LED is offset and/or aimed in a slightly different direction.

The above expressions and embodiments are presented under the assumption of a horizontally-traveling target. If the target is traveling at a known angle from the horizontal, the expressions are modified in alternate embodiments of the present invention to take this into account, by keeping the same basic concept of the present invention.

If the angle of travel is not known, it is determined in another embodiment of the invention by adding an additional light stripe, using equations similar to the example equations presented above, that will be evident to those of skill in the art.

Instead of being based on a known angle at which the target will be traveling, another embodiment of the invention is based on a known point through which the target has traveled or will travel before or after encountering the light stripes. Thus, instead of solving for h, the equations solve for an angle beta from the known point P with respect to the sensors, through which the target travels. Equivalently, the computation can be set up to solve for h, and then the angle beta is derivable from the above relations.

If the effects of gravity or wind resistance also are affecting the travel of the target, the effects of the gravity, wind resistance, and/or other forces on the target that cause its path to deviate from a straight, constant-velocity line are used in an alternate embodiment of the invention, using well-known physics or empirically-measured flight parameters. In such an embodiment, these effects are added to the equations for solving for point P. Such effects add complexity and some potential non-linearities to the equations but do not add additional variables to be solved for.

Figure 5:
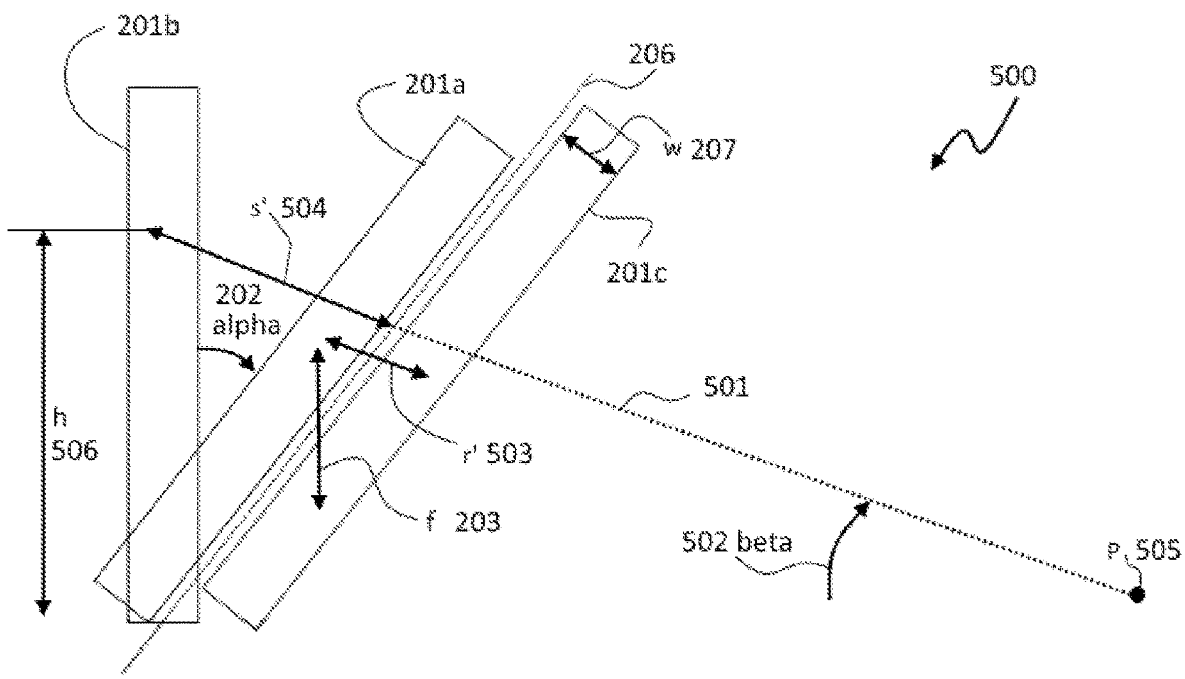
FIG. 5 illustrates an example of the path of a target object starting from a known point and passing through the light stripes of a preferred embodiment of the present invention.

The latter case is depicted in FIG. 5, which depicts a target motion pattern 500, where a target is assumed to pass through point P 505 at an initial angle 502 of beta. The target path 501 is preferably a straight line, or if gravity and/or wind (or other media) resistance are present, it alternately is a curve defined in terms of its height as a function of target velocity v and position relative to P 505. Instead of expressing the equations in terms of r 205 and s 204 as in FIG. 2, in a preferred embodiment of the invention, equations are expressed in terms of r' 503 and s' 504, which are distances along the path 501 of the target from point P 505. Since this formulation does not add additional variables, i.e., h 506 is a function of beta 502 since the position of P 505 is known with respect to the light stripes 201*a*, 201*b*, and 201*c*, the equations will be solvable for the same quantities as above, using analogous equations, as will be apparent to those of ordinary skill in the art.

An example of an application for the above would be a detector to measure the angle and speed of a football being kicked from point P 505.

Another embodiment of the present invention uses non-rectangular light stripes. For example, ovals or other shapes are used in alternate embodiments. The stripes may also have converging or diverging sides, particularly for the case where the light sources are tilted or otherwise oriented in an additional dimension so that the stripe widens as the distance from the light source increases, for example, a trapezoidal stripe if the horizontal configuration of FIG. 9 is tilted upward or downward to center the stripes on the desired target area.

The basic math for non-rectangular stripes will be similar to the equations described in this disclosure in such embodiments of the present invention, but instead of a constant w values, for example, w 207, the width of the stripe is a function of other variables, such as h. If the shape is known, then this variation can be added to the equations to compute equivalent outputs, as will be apparent to those of skill in the art. Similarly, the shapes or widths of the light stripes need not be identical, and adding terms to equations such as the examples above to take the differing widths into account will be apparent to those of skill in the art.

Calculation of tw

Since the target may not have vertical edges and/or the light stripes 201*a*, 201*b*, and 201*c* may not have rectangular edges in terms of amplitude, the amplitude of the responses 302, 303, and 304 may not be rectangular pulses, and may be more gradual, for example as shown in FIG. 3. So the calculation of tw may be more complicated than simply measuring a width. Several techniques for measuring tw may be used, utilizing techniques known to those of skill in the art:

- Measure the width of the pulse at a percentage of the pulse's maximum value, for example 50%. Then empirically determine a factor by which to multiply the width to get the effective time difference that would happen with a rectangular pulse.
- Calculate the percentage of the pulse's maximum width that corresponds to the target being at a particular distance from the center of the light stripe. For example, if the target is a sphere and the intensity profile of the light stripe is known, it is possible to computer the distance from the center of the light stripe at which the sphere must be to reflect 10% the amount of light that it does at the center of the light stripe.

Figure 6:
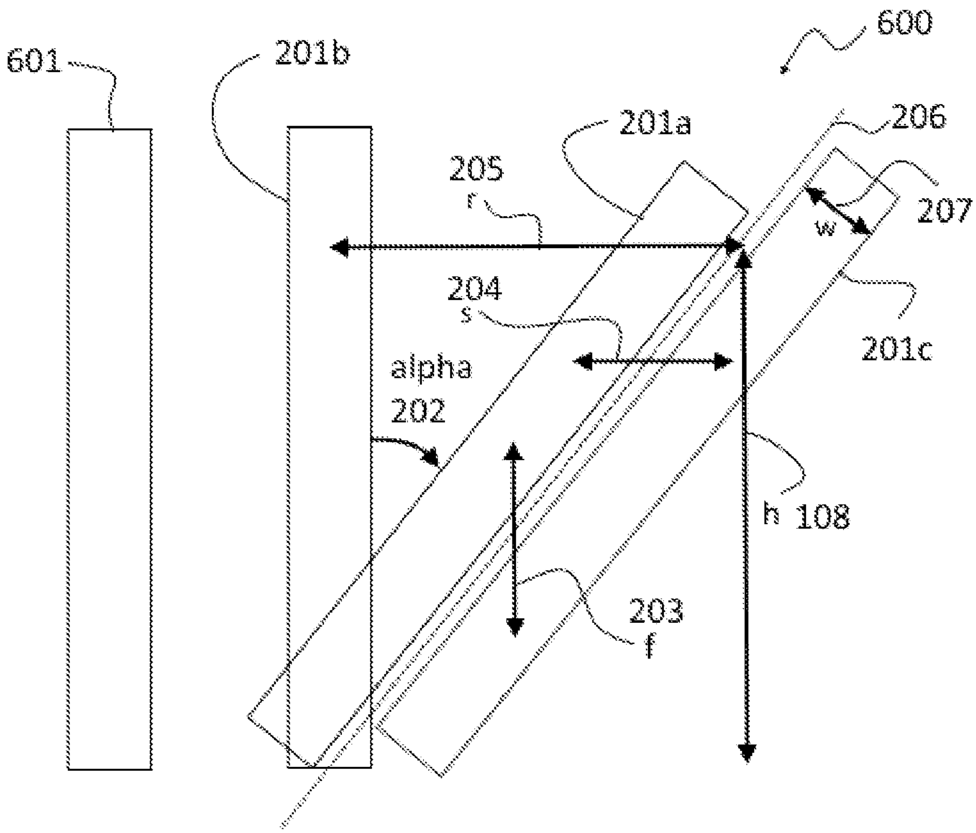
FIG. 6 illustrates an example of an embodiment of the present invention utilizing four light stripes.

Another preferred embodiment of the present invention uses an additional light stripe to overcome the above-referenced issues associated with not knowing the width W of the target object. A preferred embodiment uses an additional vertical stripe as shown in FIG. 6, which depicts a four-stripe light stripe pattern 600. Instead of measuring the time tw as the time for the target to pass through stripe 201*b*, the time between the target being in the additional light stripe 601 and stripe 201*b* is used. In the preferred embodiment, an additional LED is positioned adjacent to LED 101*b* to create an additional vertical stripe, preferably sharing the same cylindrical lens with 101*b*, and optional aimed or so that its light stripe is correspondingly offset with distance as shown for stripe 601 in FIG. 6. In a preferred embodiment, the definition of angle theta is changed to instead be the angle difference between the orientation of LED 101*b* and the orientation of the additional LED, and analogous equations as above are used in the position calculations, since the distance between stripe 601 and stripe 201*b* will retain the form of, or similar to:

$$w=d\ \tan\ (\text{theta}) \tag{22}$$

Then in measuring tw, this embodiment of the invention computes the time between the peaks of the two light stripe responses or between characteristic positions of the two light stripe responses.

Other Variations

Figure 7:
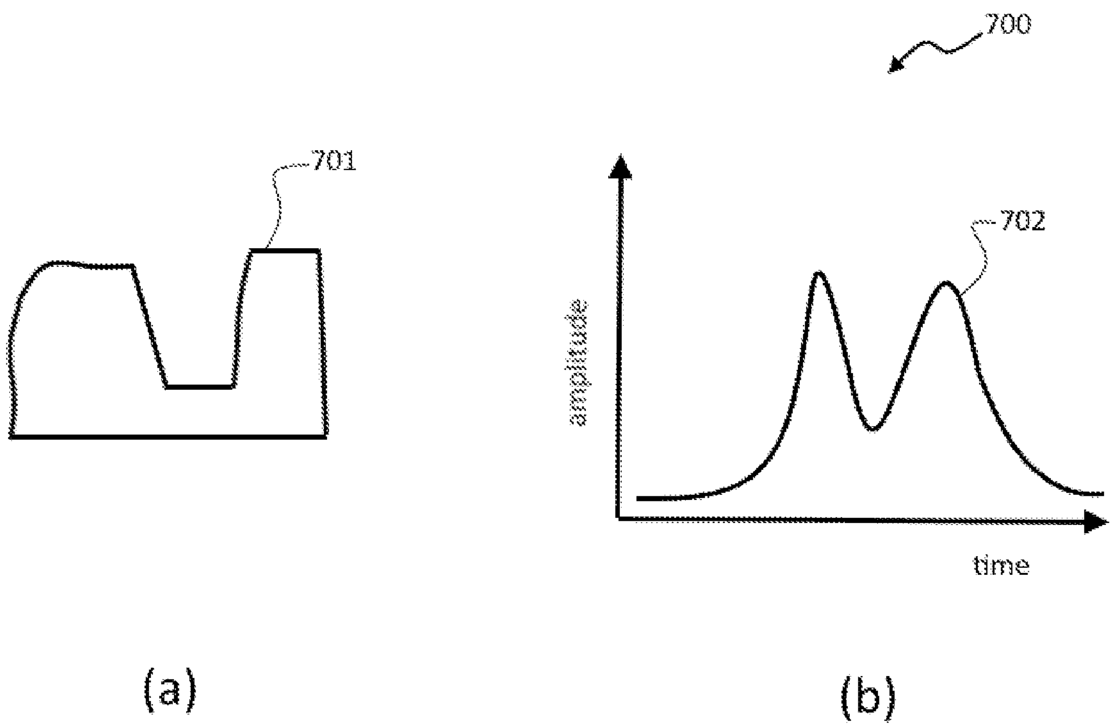
FIG. 7 provides an example of the detected light signal from a light stripe if the target object has a spatially-varying light reflectivity.

If the target object is more complex than a sphere, circle, rectangle, etc., unlike the single-peak pulses shown in FIG. 3, it may produce a response shape that is more complex. For example, FIG. 7 shows a complex target scenario 700, in which the target shape is as shown by object 701 in FIG. 7*a*, which in this example, produces a two-peaked response curve 702 in FIG. 7*b*, if the target moving toward the right across a vertical light stripe, for example light stripe 201*b*. To handle this case, a preferred embodiment of the invention finds the time offset between a particular part of the response curve, rather than its overall maximum peak value, for example, the time at which the first peak occurs. If the response curve is known ahead of time, the preferred embodiment is configured to detect this point, otherwise, the system traces the response curve dynamically and looks for a predetermined feature, such as the first peak, or alternately, performs a correlation or convolution of the response curves to determine the time difference that best describes their relative shift. In the preferred embodiment, the time-difference process also compresses the time scale of one or more of the light-stripe response curves as a function of the twist angle alpha of the respective light stripe to normalize the response curves for comparison to each other and for computation of the time difference between them.

In another embodiment of the present invention, if the target object is relatively large compared to the light stripes, it may increase accuracy to not treat the object as a point in terms of its height and distance. For example, the top of the object may exhibit a considerably larger value for r 205 than the bottom of the object. In this embodiment, the timing effects in the above equations involving r, s, and w, are integrated over the extent of the target, as will be apparent to those of skill in the art. Alternately, instead of an integral, the equations for r, s, and w may be performed for several points along the extent of the object, for example, for three points.

Although one of the advantages of the present invention is the avoidance of basing the calculations solely on amplitudes of reflected light, an alternate embodiment of the invention additionally makes use of the amplitude of reflected light. For example, if the reflectivity of the target object is known, the strength or amplitude of the reflected light, for example, in response waveforms 301, 302, and 304 of FIG. 3, is used to provide an independent estimate of the distance to the target, for example distance d 106. This can be weighted with the other calculations for d, or in another embodiment, this equation is used to enable the use of only two light stripes, still providing enough information to solve for the needed variables, as will be apparent to those of skill in the art. In other embodiments of the present invention, ratios of the reflected amplitudes from the light sources is used to estimate distance or other parameters of position. In one such embodiment, the ratio of the amplitudes of the reflected light signals provides additional information using techniques derived from the ratiometric approach in U.S. Pat. No. 7,123,351 to Schaefer. In one embodiment, the ratiometric calculations further improve the estimates of the three-or-more stripe system; in another embodiment, the ratios allow fewer light stripes to be used, while still allowing for the needed variables to be solved for.

Another embodiment of the present invention includes only two light stripes, and solves for fewer of the variables, using adaptations of the above equations that will be apparent to those of skill in the art.

The foregoing disclosure of the preferred embodiments of the present invention has been presented for purposes of illustration and description. It is not intended to be exhaustive or to limit the invention to the precise forms disclosed. The specific equations and steps do not represent the entire scope or an optimization of the invention and are presented primarily to explain the features and concepts of the invention. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

The invention claimed is:

1. A system for providing position information about an object traversing a path relative to the system comprising:

a plurality of light sources configured to shine a plurality of light stripes that intersect the path traversed by the object relative to the system, wherein each of the plurality of light stripes shines with an associated tilt angle, an associated twist angle, and an associated beam-spreading angle, and wherein a first tilt angle associated with a first light stripe of the plurality of light stripes is substantially different than a second tilt angle associated with a second light stripe of the plurality of light stripes, and wherein a first light source of the plurality of light sources is configured to shine at a first time and wherein a second light source of the plurality of light sources is configured to shine at a second time that is substantially different than the first time;

a light detector having a field of view configured to intersect the path traversed by the object relative to the system and configured to output a plurality of waveform signals corresponding to intensities of light reflected from the plurality of light stripes, wherein the light detector is configured to output a first waveform signal of the plurality of waveform signals corresponding to the first light source, based on light detected at the first time, and wherein the light detector is further configured to output a second waveform signal of the plurality of waveform signals corresponding to the second light source, based on light detected at the second time;

a timing detector configured to receive the plurality of waveform signals and to output a plurality of time difference signals associated with two or more of the plurality of waveform signals, and further configured to output a time duration signal based on at least one of the plurality of waveform signals;

and a distance calculator configured to receive the plurality of time difference signals and the time duration signal and to output a distance signal comprising information about a distance of the object from the system, based on the plurality of time difference signals, the time duration signal, the tilt angles, the twist angles, and at least one of the beam-spreading angles.

2. The system of claim 1, wherein at least one of the plurality of light sources comprises an infrared light-emitting diode.

3. The system of claim 1, wherein the light detector comprises a photodiode and/or a phototransistor.

4. The system of claim 1, wherein the plurality of light sources comprises at least three light sources and wherein the plurality of light stripes comprises at least three light stripes, and wherein a first light stripe of the plurality of light stripes and a second light stripe of the plurality of light stripes are associated with one or more substantially equal twist angles, and wherein a third light stripe of the plurality of light stripes is associated with a substantially different twist angle than the one or more substantially equal twist angles.

5. The system of claim 1, wherein at least one of the plurality of light sources comprises a lens configured to spread light in a first direction to a greater extent than in a second direction.

6. The system of claim 1, further comprising a height calculator configured to receive the plurality of time difference signals and the time duration signal and to output a height signal comprising information about a distance of the object from a reference plane relative to the system, based on the plurality of time difference signals, the time duration signal, the tilt angles, and the twist angles, and further based on at least one of the beam-spreading angles.

7. The system of claim 6, further comprising a speed calculator configured to receive the plurality of time difference signals and the time duration signal and to output a speed signal comprising information about a speed of the object, based on the plurality of time difference signals, the time duration signal, the tilt angles, and the twist angles, and further based on at least one of the beam-spreading angles.

8. The system of claim 1, further comprising a speed calculator configured to receive the plurality of time difference signals and the time duration signal and to output a speed signal comprising information about a speed of the object, based on the plurality of time difference signals, the time duration signal, the tilt angles, and the twist angles, and further based on at least one of the beam-spreading angles.

9. The system of claim 1, wherein the timing detector comprises a peak detector configured to receive at least two of the plurality of waveform signals, and wherein the peak detector is configured to output a signal corresponding to a time difference between peaks of the at least two of the plurality of waveform signals.

10. The system of claim 1, wherein the timing detector comprises a correlation and/or a convolution detector configured to receive at least two of the plurality of waveform signals, and wherein the timing detector is configured to output at least one of the time difference signals on the basis of the correlation and/or convolution detector.

11. The system of claim 1, wherein the timing detector comprises a threshold detector configured to output the time duration signal based on an interval of time in which the at least one of the plurality of waveform signals exceeds a threshold amplitude value.

12. The system of claim 1, wherein at least one of the beam-spreading angles is substantially greater than zero, whereby substantial changes in distance of the object relative to the system cause substantial changes in the time duration signal.

13. The system of claim 1, wherein the plurality of light sources are mounted in a substantially linear spatial layout.

14. A system for providing position information about an object traversing a path relative to the system comprising:

a plurality of light sources configured to shine a plurality of light stripes that intersect the path traversed by the object relative to the system, wherein each of the plurality of light stripes shines with an associated tilt angle and an associated twist angle, and wherein a first tilt angle associated with a first light stripe of the plurality of light stripes is substantially different than a second tilt angle associated with a second light stripe of the plurality of light stripes;

a light detector having a field of view configured to intersect the path traversed by the object relative to the system and configured to output a plurality of waveform signals corresponding to intensities of light reflected from the plurality of light stripes, a timing detector configured to receive the plurality of waveform signals and to output a plurality of time difference signals associated with two or more of the plurality of waveform signals;

an amplitude detector configured to receive the plurality of waveform signals and to output an amplitude signal on the basis of amplitudes associated with two or more of the plurality of waveform signals, wherein the amplitude detector comprises a ratio detector configured to receive the plurality of waveform signals and to output the amplitude signal on the basis of a ratio of amplitudes associated with two or more of the plurality of waveform signals;

and a distance calculator configured to receive the plurality of time difference signals and the amplitude signal and to output a distance signal comprising information about a distance of the object from the system, based on the plurality of time difference signals, the amplitude signal, the tilt angles, and the twist angles.

15. The system of claim 14, wherein the plurality of light stripes comprises not more than two light stripes.

16. The system of claim 14, further comprising a height calculator configured to receive the plurality of time difference signals and the amplitude signal, and to output a height signal comprising information about a distance of the object from a reference plane relative to the system, based on the plurality of time difference signals, the amplitude signal, the tilt angles, and the twist angles.

17. The system of claim 14, further comprising a speed calculator configured to receive the plurality of time difference signals and the amplitude signal, and to output a speed signal comprising information about a speed of the object, based on the plurality of time difference signals, the amplitude signal, the tilt angles, and the twist angles.

18. A system for providing position information about an object traversing a path relative to the system comprising:

a plurality of light sources configured to shine a plurality of light stripes that intersect the path traversed by the object relative to the system, wherein each of the plurality of light stripes shines with an associated tilt angle, an associated twist angle, and an associated beam-spreading angle, and wherein a first tilt angle associated with a first light stripe of the plurality of light stripes is substantially different than a second tilt angle associated with a second light stripe of the plurality of light stripes;

a light detector having a field of view configured to intersect the path traversed by the object relative to the system and configured to output a plurality of waveform signals corresponding to intensities of light reflected from the plurality of light stripes;

a timing detector configured to receive the plurality of waveform signals and to output a plurality of time difference signals associated with two or more of the plurality of waveform signals, and further configured to output a time duration signal based on at least one of the plurality of waveform signals;

and a distance calculator configured to receive the plurality of time difference signals and the time duration signal and to output a distance signal comprising information about a distance of the object from the system, based on the plurality of time difference signals, the time duration signal, the tilt angles, the twist angles, and at least one of the beam-spreading angles;

wherein the system is configured to be associated with a moving observation point, whereby relative motion of the system and the object enables the plurality of light sources to effectively scan the object even if the object is stationary.

19. The system of claim 18, wherein the light detector comprises a photodiode and/or a phototransistor.

20. The system of claim 18, wherein the plurality of light sources comprises at least three light sources and wherein the plurality of light stripes comprises at least three light stripes, and wherein a first light stripe of the plurality of light stripes and a second light stripe of the plurality of light stripes are associated with one or more substantially equal twist angles, and wherein a third light stripe of the plurality of light stripes is associated with a substantially different twist angle than the one or more substantially equal twist angles.

21. The system of claim 18, further comprising a speed calculator configured to receive the plurality of time difference signals and the time duration signal and to output a speed signal comprising information about a speed of the object, based on the plurality of time difference signals, the time duration signal, the tilt angles, and the twist angles, and further based on at least one of the beam-spreading angles.

22. The system of claim 18, wherein the timing detector comprises a peak detector configured to receive at least two of the plurality of waveform signals, and wherein the peak detector is configured to output a signal corresponding to a time difference between peaks of the at least two of the plurality of waveform signals.

* * * * *